US012748576B2

(12) United States Patent
Hsieh et al.

(10) Patent No.: US 12,748,576 B2
(45) Date of Patent: Sep. 29, 2026

(54) GRAPH ANALYSIS AND MANIPULATION

(71) Applicant: Microsoft Technology Licensing, LLC, Redmond, WA (US)

(72) Inventors: Tsuwang Hsieh, Sammamish, WA (US); Sathiya Kumaran Mani, Kirkland, WA (US); Ranveer Chandra, Kirkland, WA (US); Srikanth Kandula, Redmond, WA (US); Santiago Martin Segarra, Houston, TX (US); Yajie Zhou, Riverdale Park, MD (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 236 days.

(21) Appl. No.: 18/395,321

(22) Filed: Dec. 22, 2023

(65) Prior Publication Data

US 2025/0036375 A1 Jan. 30, 2025

Related U.S. Application Data

(60) Provisional application No. 63/528,756, filed on Jul. 25, 2023.

(51) Int. Cl.

| | |
|---|---|
| ***G06F 40/40*** | (2020.01) |
| ***G06F 8/35*** | (2018.01) |
| ***G06F 16/901*** | (2019.01) |
| ***G06F 40/295*** | (2020.01) |
| ***G06F 40/58*** | (2020.01) |
| ***G06N 3/042*** | (2023.01) |
| ***G06N 3/0455*** | (2023.01) |
| *G06F 8/41* | (2018.01) |
| *G06F 8/65* | (2018.01) |
| *G06F 16/2452* | (2019.01) |

(52) U.S. Cl.
CPC ............ *G06F 8/35* (2013.01); *G06F 16/9024* (2019.01); *G06F 8/436* (2013.01); *G06F 8/4441* (2013.01); *G06F 8/65* (2013.01); *G06F 16/24522* (2019.01)

(58) Field of Classification Search
CPC ... G06F 8/35; G06F 8/65; G06F 8/436; G06F 8/4441; G06F 16/9024; G06F 16/24522
See application file for complete search history.

(56) References Cited

U.S. PATENT DOCUMENTS

| | | | | |
|---|---|---|---|---|
| 2018/0144062 | A1* | 5/2018 | Jan | G06F 16/9024 |
| 2022/0244938 | A1* | 8/2022 | Alamir | G06N 5/022 |

(Continued)

OTHER PUBLICATIONS

Jiayan Guo et al., GPT4Graph: Can Large Language Models Understand Graph Structured Data? An Empirical Evaluation and Benchmarking, Jul. 11, 2023, [Retrieved on Dec. 9, 2025]. Retrieved from the internet: <URL: https://arxiv.org/pdf/2305.15066> 11 Pages (1-11) (Year: 2023).*

(Continued)

*Primary Examiner* — Anibal Riveracruz
(74) *Attorney, Agent, or Firm* — Rainier Patents, P.S.

(57) ABSTRACT

Network management automation includes a graph analysis and manipulation tool configured to receive a natural language prompt relating to a network management activity. The graph analysis and manipulation tool is also configured to access a graph resource and to generate code that addresses the network management activity as a graph manipulation task.

20 Claims, 9 Drawing Sheets

METHOD 500

(56) References Cited

U.S. PATENT DOCUMENTS

| | | | | |
|---|---|---|---|---|
| 2022/0414228 | A1* | 12/2022 | Difonzo | G06F 40/169 |
| 2024/0394308 | A1* | 11/2024 | Mcthrow | G06F 16/9024 |
| 2025/0111192 | A1* | 4/2025 | Bayless | G06N 3/006 |
| 2025/0139168 | A1* | 5/2025 | Hsu | G06F 16/90332 |

OTHER PUBLICATIONS

Alexander Dunn et al., Structured information extraction from complex scientific text with fine-tuned large language models, Dec. 10, 2022, [Retrieved on Dec. 9, 2025]. Retrieved from the internet: <URL: https://arxiv.org/pdf/2212.05238> 21 Pages (1-21) (Year: 2022).*

Date, C. J., "A guide to the SQL standard (2nd ed.)", In Publication of Addison Wesley; 2nd edition, Sep. 1, 1989.

He, et al., "Explanations as Features: LLM-Based Features for Text-Attributed Graphs", arxiv.org, Cornell University Library, 201 Olin Library Cornell University Ithaca, NY 14853, May 31, 2023, pp. 1-15.

International Search Report and Written Opinion received for PCT Application No. PCT/US2024/037483, Oct. 8, 2024, 16 pages.

Vaithilingam, et al., "Expectation vs. Experience: Evaluating the Usability of Code Generation Tools Powered by Large Language Models", CHI Conference on Human Factors in Computing Systems, ACM, New York, NY, USA, Apr. 27, 2022, pp. 1-7.

"Azure OpenAI Service pricing", Retrieved from: https://azure.microsoft.com/en-us/pricing/details/cognitive-services/openai-service/, Retrieved Date: Jul. 4, 2023, 08 Pages.

"Bard", Retrieved from: https://bard.google.com/?hl=en, Retrieved Date: Jul. 4, 2023, 1 Page.

"ChatGPT plugins", Retrieved from: https://openai.com/blog/chatgpt-plugins, Retrieved Date: Jul. 4, 2023, 22 Pages.

"Data protection", Retrieved from: https://commission.europa.eu/law/law-topic/data-protection_en, Retrieved Date: Jul. 4, 2023, 03 Pages.

"GPT-4 Technical Report", In Repository of arXiv:2303.08774v1, Mar. 15, 2023, 100 Pages.

"Introducing ChatGPT", Retrieved from: https://openai.com/blog/chatgpt, Retrieved Date: Jul. 4, 2023, 11 Pages.

"Introducing GitHub Copilot X", Retrieved from: https://github.com/features/preview/copilot-x, Retrieved Date: Jul. 4, 2023, 09 Pages.

"Malt-example-models", Retrieved from: https://github.com/google/malt-example-models, Jun. 2, 2023, 1 Page.

"Models—OpenAI API", Retrieved from: https://platform.openai.com/docs/models/overview, Retrieved Date: Jul. 4, 2023, 09 Pages.

"NetworkX: Network analysis in Python", Retrieved from: https://networkx.org/, Apr. 2023, 1 Page.

"Pandas", Retrieved from: https://pandas.pydata.org/, Jun. 28, 2023, 4 Pages.

Anil, et al., "PaLM 2 Technical Report", In Repository of arXiv:2305.10403v1, May 17, 2023, pp. 1-93.

Austin, et al., "Program Synthesis with Large Language Models", In Repository of arXiv:2108.07732v1, Aug. 16, 2021, 34 Pages.

Backus, et al., "The FORTRAN automatic coding system", In Western joint computer conference: Techniques for reliability, Feb. 26, 1957, pp. 188-198.

Balog, et al., "Deepcoder: Learning to write programs", In Proceedings of International Conference on Learning Representations, Apr. 24, 2017, pp. 1-19.

Beckett, et al., "A General Approach to Network Configuration Verification", In Proceedings of the Conference of the ACM Special Interest Group on Data Communication},, Aug. 21, 2017, pp. 155-168.

Brown, et al., "Language Models are Few-Shot Learners", In Journal of Advances in neural information processing systems, vol. 33, Dec. 6, 2020, 25 Pages.

Bubeck, et al., "Sparks of Artificial General Intelligence: Early Experiments with GPT-4", In Repository of arXiv:2303.12712v1, Mar. 22, 2023, 155 Pages.

Chen, et al., "CodeT: Code Generation with Generated Tests", In Repository of arXiv:2207.10397v1, Jul. 21, 2022, 12 Pages.

Chen, et al., "Evaluating Large Language Models Trained on Code", In Repository of arXiv:2107.03374v1, Jul. 7, 2021, 35 Pages.

Chen, et al., "Improving code generation by training with natural language feedback", In Repository of arXiv:2303.16749v1, Mar. 28, 2023, 20 Pages.

Chen, et al., "Teaching Large Language Models to Self-Debug", In Repository of arXiv:2304.05128v1, Apr. 11, 2023, pp. 1-68.

Chowdhery, et al., "PaLM: Scaling Language Modeling with Pathways", In Repository of arXiv:2204.02311v1, Apr. 5, 2022, 83 Pages.

Eloundou, et al., "GPTs are GPTs: An Early Look at the Labor Market Impact Potential of Large Language Models", In Repository of arXiv:2303.10130v5, Aug. 21, 2023, 36 Pages.

Fogel, et al., "A General Approach to Network Configuration Analysis", In Proceedings of the 12th USENIX Symposium on Networked Systems Design and Implementation, May 4, 2015, pp. 469-483.

Fried, et al., "Incoder: A generative model for code infilling and synthesis", In Repository of arXiv:2204.05999v1, Apr. 12, 2022, 25 Pages.

Glatz, et al., "Visualizing big network traffic data using frequent pattern mining and hypergraphs", In Journal of Computing, vol. 96, Issue 1, Jan. 23, 2014, pp. 27-38.

Gulwani, Sumit, "Automating String Processing in Spreadsheets Using Input-Output Examples", In Proceedings of the 38th Annual ACM SIGPLAN-SIGACT symposium on Principles of programming languages, vol. 46, Issue 1, Jan. 26, 2011, pp. 317-329.

Gulwani, et al., "Program Synthesis", In Journal of Foundations and Trends in Programming Languages, vol. 4, Issue 1-2, Jul. 11, 2017, 33 Pages.

Gupta, et al., "Sonata: Query-Driven Streaming Network Telemetry", In Proceedings of the conference of the ACM special interest group on data communication, Aug. 7, 2018, pp. 357-371.

Iliofotou, et al., "Network Monitoring using Traffic Dispersion Graphs (TDGs)", In Proceedings of the 7th ACM SIGCOMM Conference on Internet Measurement, Oct. 24, 2007, pp. 315-320.

Kandula, et al., "Shrink: A Tool for Failure Diagnosis in IP Networks", In Proceedings of the ACM SIGCOMM Workshop on Mining Network Data, Aug. 22, 2005, pp. 173-178.

Le, et al., "Traffic dispersion graph based anomaly detection", In Proceedings of the 2nd Symposium on Information and Communication Technology, Oct. 2011, pp. 36-41.

Lee, et al., "Network monitoring: Present and future", In Journal of Computer Networks, vol. 65, Jun. 2, 2014.

Li, et al., "Competition-Level Code Generation with AlphaCode", In Repository of arXiv:2203.07814v1, Feb. 8, 2022, 74 Pages.

Li, et al., "StarCoder: may the source be with you!", In Repository of arXiv:2305.06161v1, May 9, 2023, pp. 1-54.

Lundberg, et al., "guidance", Retrieved from: https://github.com/guidance-ai/guidance, Jun. 21, 2023, 23 Pages.

Manna, et al., "Toward automatic program synthesis", In Journal of Communications of the ACM, vol. 14, Issue 3, Mar. 1971, pp. 151-165.

Mogul, et al., "Experiences with Modeling Network Topologies at Multiple Levels of Abstraction", In Proceedings of 17th USENIX Symposium on Networked Systems Design and Implementation, Feb. 25, 2020, pp. 403-418.

Roy, et al., "Passive Realtime Datacenter Fault Detection and Localization", In Proceedings of the 14th USENIX Symposium on Networked Systems Design and Implementation, Mar. 27, 2017, pp. 595-612.

Shi, et al., "Natural language to code translation with execution", In Proceedings of Proceedings of the 2022 Conference on Empirical Methods in Natural Language Processing, Dec. 7, 2022, pp. 3533-3546.

Shinn, et al., "Reflexion: Language agents with verbal reinforcement learning", In Repository of arXiv:2303.11366v3, Jun. 10, 2023, 18 Pages.

(56) References Cited

OTHER PUBLICATIONS

Singhal, et al., "Large Language Models Encode Clinical Knowledge", In repository of arxiv code: 2212.13138v1 [cs.CL], Dec. 26, 2022, 44 Pages.
Tahaei, et al., "The rise of traffic classification in IoT networks: A survey", In Journal of Network and Computer Applications,, Mar. 15, 2020.
Touvron, et al., "Llama: Open and efficient foundation language models", In Repository of arXiv:2302.13971v1, Feb. 27, 2023, 27 Pages.
Trummer, Immanuel, "CodexDB: Synthesizing code for query processing from natural language instructions using GPT-3 Codex", In Proceedings of the VLDB Endowment, vol. 15, Issue 11, Jul. 1, 2022, pp. 2921-2928.
Wei, et al., "Chain-of-thought prompting elicits reasoning in large language models", In Proceedings of 36th Conference on Neural Information Processing Systems, Dec. 6, 2022, pp. 1-14.
White, et al., "ChatGPT Prompt Patterns for Improving Code Quality, Refactoring, Requirements Elicitation, and Software Design", In Repository of arXiv:2303.07839v1, Mar. 11, 2023, 14 Pages.
Zhang, et al., "Automatic chain of thought prompting in large language models", In Repository of arXiv:2210.03493v1, Oct. 7, 2022, 25 Pages.
Date, C. J., "A Guide to the SQL Standard", Addison-Wesley Longman Publishing Co, Inc., 2nd Edition, 1989.
Zhou, et al., "Flow Event Telemetry on Programmable Data Plane", In Proceedings of the Annual conference of the ACM Special Interest Group on Data Communication on the applications, technologies, architectures, and protocols for computer communication, Jul. 30, 2020, pp. 76-89.
Zhao, et al., "A Survey of Large Language Models", In Repository of arXiv:2303.18223v11, Jun. 29, 2023, pp. 1-85.
International Preliminary Report on Patentability (Chapter I) received for PCT Application No. PCT/US2024/037483, mailed on Feb. 5, 2026, 10 pages.

* cited by examiner

GRAPH ANALYSIS AND MANIPULATION

PRIORITY

This utility patent application is a non-provisional of, and claims priority to, U.S. Provisional Application 63/528,756 filed on Jul. 25, 2023, which is hereby incorporated by reference in its entirety.

BACKGROUND

Modern network management requires analysis of network topologies and communication graphs for diverse tasks. However, the absence of a cohesive approach results in a challenging learning curve and heightened errors and inefficiencies.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

DETAILED DESCRIPTION

Figure 1A:
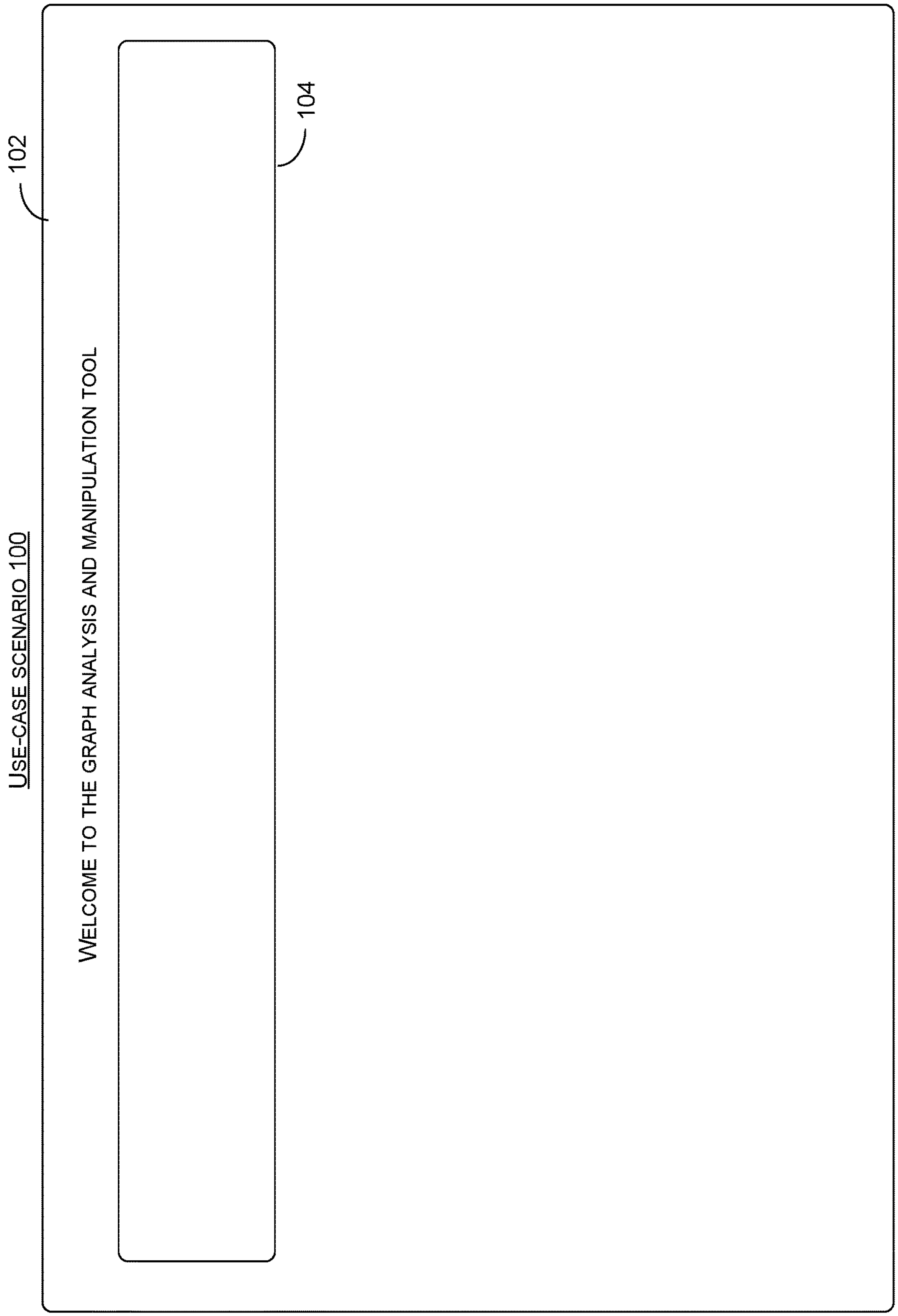
FIGS. 1A-1D illustrate example use case scenarios relating to graph analysis and manipulation concepts consistent with some implementations of the present concepts.

Modern network management requires analysis of network topologies and communication graphs for diverse tasks. However, the absence of a cohesive approach results in a challenging learning curve and heightened errors and inefficiencies. The present concepts include an innovative approach to transform network management by leveraging large artificial intelligence (LAI) models, such as large language models (LLMs) to generate task-specific code for graph manipulation through natural language queries. Stated another way, the present concepts enable natural-language-based network management experiences, leveraging LLMs to generate task-specific code from natural language queries. This technical solution tackles challenges relating to explainability, scalability, and privacy by allowing network operators to inspect the generated code. This eliminates the need to share network data with LLMs, and concentrates on application-specific requests combined with general program synthesis techniques. Implementations are evaluated using benchmark applications, showcasing high accuracy, cost-effectiveness, and the potential for further enhancements using advanced and complementary program synthesis techniques.

One critical aspect of contemporary network management involves analyzing and performing actions on network topologies and communication graphs for tasks such as capacity planning, configuration analysis, and traffic analysis. For instance, network operators may pose capacity planning questions such as "What is the most cost-efficient way to double the network bandwidth between these two data centers?" using network topology data. Similarly, they may ask diagnostic questions like "What is the required number of hops for data transmission between these two nodes?" using communication graphs. Network operators today rely on an expanding array of tools and domain-specific languages (DSLs) for these operations. The absence of a unified approach to these tasks leads to a steep learning curve and increased errors and inefficiencies in manual operations. The present concepts provide a unified approach that provides a technical solution that reduces the learning curve and minimizes errors and inefficiencies in manual operations.

Leveraging large artificial intelligence models, such as large language models (LLMs), offers a promising solution to these technical challenges by enabling network administrators and operators to streamline tasks using natural language. LLMs have demonstrated exceptional proficiency in interpreting human language and providing high-quality answers across various domains. The capabilities of LLMs can potentially bridge the gap between diverse tools and DSLs, leading to more efficient network management and a more cohesive approach to handling network-related questions and tasks.

Unfortunately, no existing systems facilitate graph manipulation using natural language, and asking LLMs to directly manipulate network topologies introduces three fundamental challenges related to explainability, scalability, and privacy. First, explaining the output of LLMs and enabling LLMs to reason about complex problems remain unsolved issues. This complicates the process of determining the methods employed by LLMs in deriving answers and evaluating their correctness. Second, LLMs are constrained by limited token window sizes, which restricts their capacity to process extensive network topologies and communication graphs. For example, state-of-the-art LLMs such as Bard, ChatGPT, and GPT-4 permit only 2 k to 32 k tokens in their prompts, which can accommodate merely a small network topology comprising tens of nodes and hundreds of edges. Third, network data may consist of personally identifiable information (PII), such as IP addresses, raising privacy concerns when transferring this information to LLMs for processing. The present technical solutions address these challenges to develop a more effective approach to integrating LLMs in network management tasks.

The present concepts involve a novel approach to revolutionize network management by leveraging the power of LLMs to create task-specific code for graph analysis and manipulation. This novel approach enhances network management by leveraging LLMs to create task-specific code for graph analysis and manipulation, which facilitates a natural-language-based network administration.

FIGS. 1A-1D depict an example use-case scenario 100 that illustrates how some implementations can generate and execute LLM-produced code in response to a network operator's natural language query.

Stated another way, these FIGS. depict how an example system generates and executes LLM-produced code in response to a network operator's natural language query. This approach tackles the explainability challenge by allowing network operators to examine the LLM-generated code, enabling them to comprehend the underlying logic that fulfills the query. Additionally, it delegates computation to program execution engines, thereby minimizing arithmetic inaccuracies and LLM-induced hallucinations. Furthermore, this approach overcomes scalability and privacy issues by removing the need to share network data with LLMs.

A primary technical challenge lies in generating high-quality code to accomplish network management tasks. Al through LLMs have shown remarkable capabilities in general code generation. However, LLMs lack an understanding of domain and application specific requirements. To tackle this challenge, the present concepts involve a novel framework that combines application-specific requests with general program synthesis techniques to create customized code for graph manipulation tasks in network management. The architecture divides code generation into two components: (1) an application-specific element that provides context, instructions, or plugins, which enhance the LLMs' comprehension of network structures and terminology, and (2) a code generation element that leverages suitable libraries and program synthesis techniques. This architecture fosters independent innovation of the distinct components, and evidence indicates substantial code quality improvements.

Figure 1B:
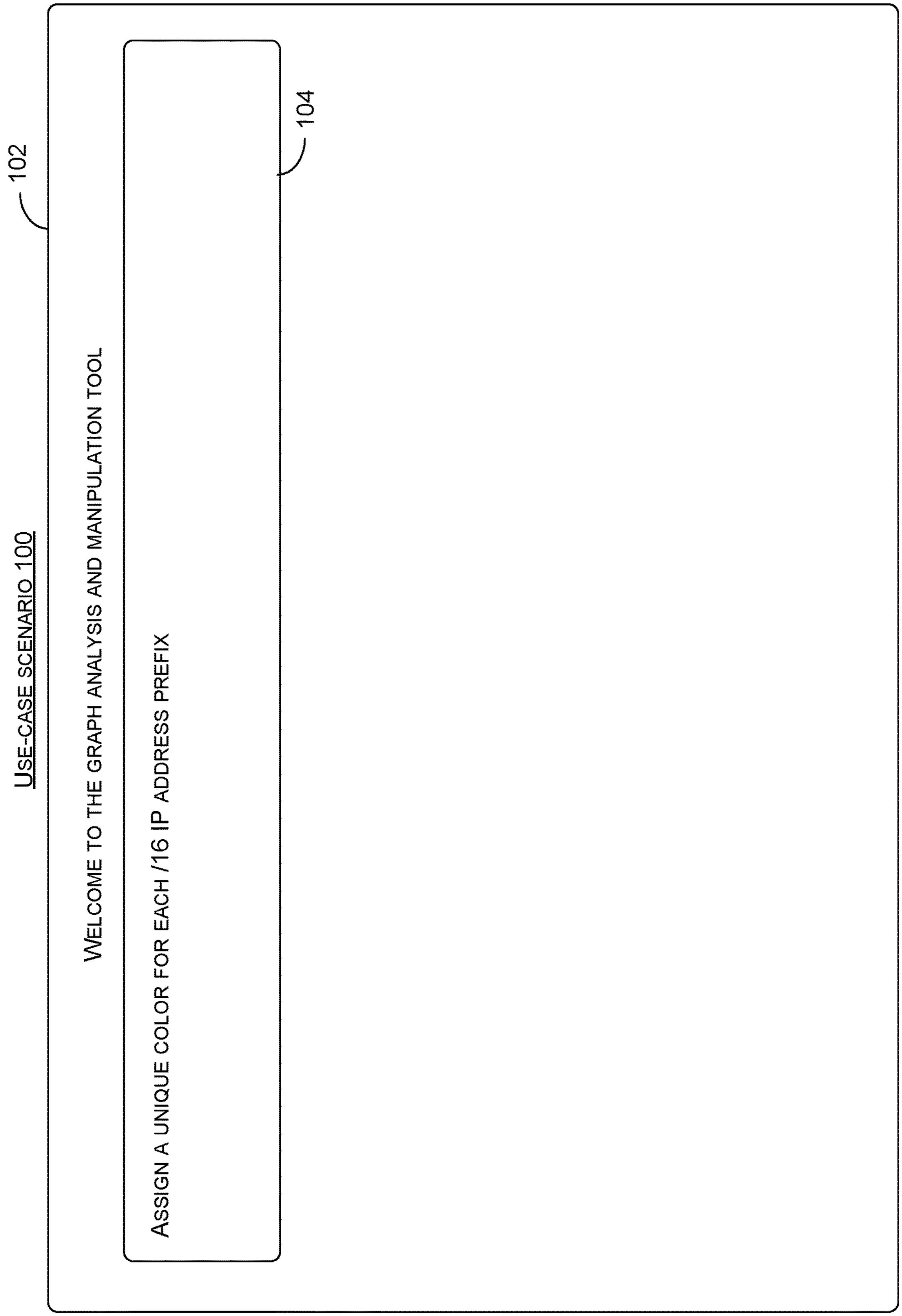

FIG. 1A shows an example user-interface 102 relating to a graph analysis and manipulation tool. The user-interface 102 allows the user to enter a natural language network request at 104. As shown in FIG. 1B, in this example, the natural language network request is "Assign a unique color for each /16 IP address prefix." Note that patterns and shading are utilized on the nodes of the line drawings of FIG. 1D to represent colors.

Figure 1C:
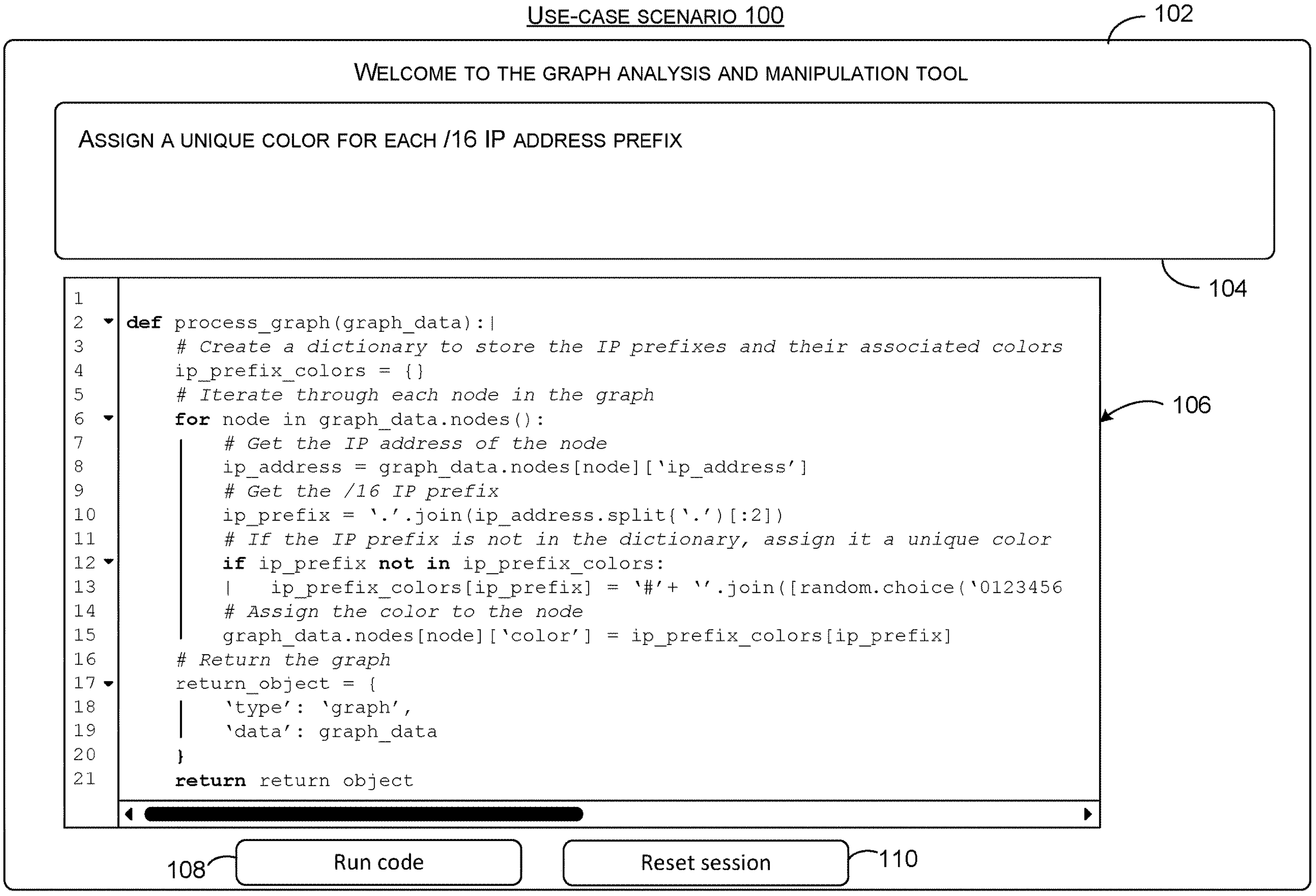

FIG. 1C shows the user-interface with the associated code 106 generated by the LLM. The user can review the code 106 and decide to select either to run the code at 108 or to reset the session (e.g., discard the code) and start again at 110.

Figure 1D:
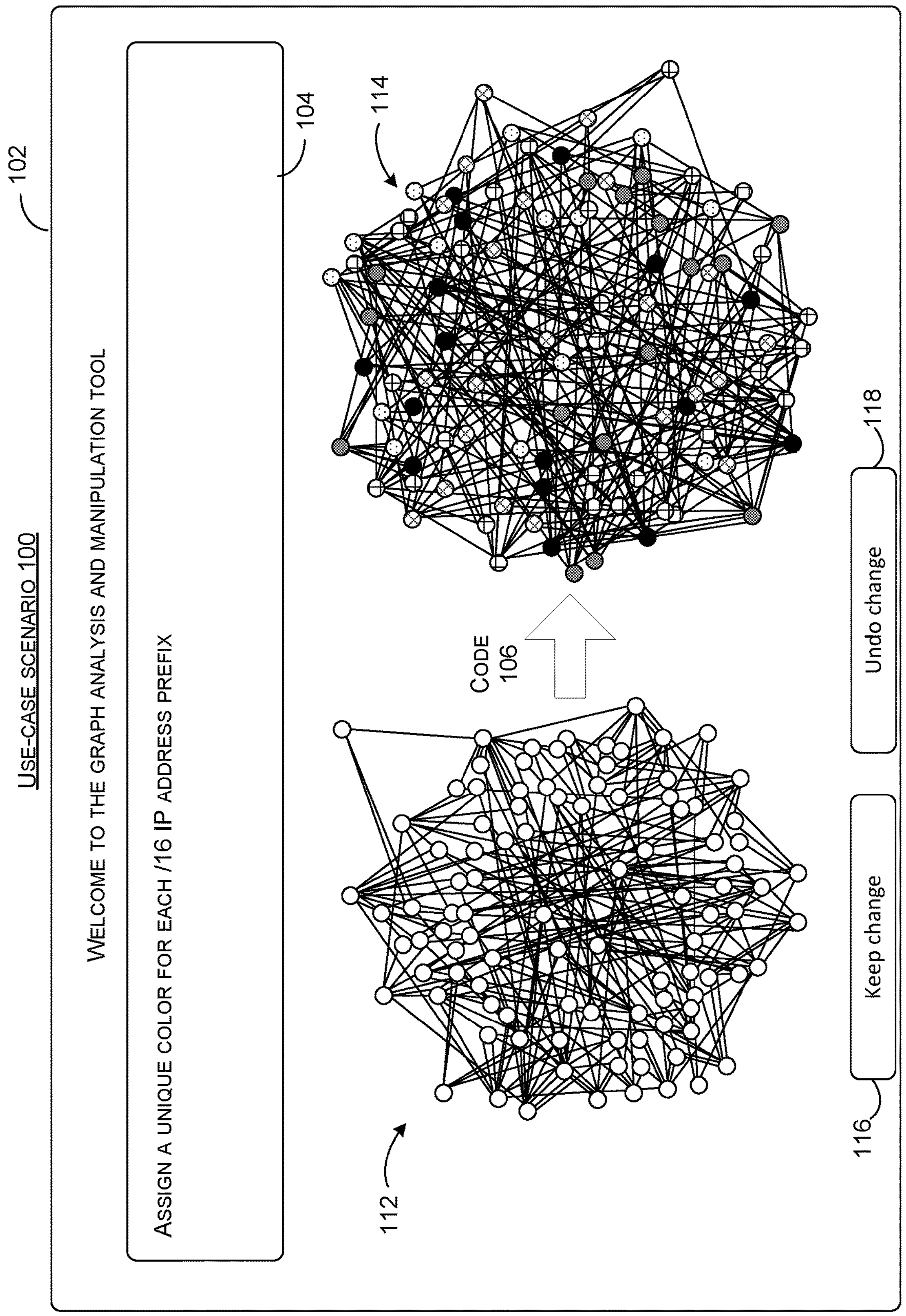

FIG. 1D shows an original communication graph 112 and the updated communication graph 114 produced by the code 106. The user can select to keep the changes (e.g., the updated graph) at 116 or undo the changes and return to the original graph at 118. The terms "communication graph" and "graph" are used interchangeably in this document. Further, as mentioned above, patterns and shading are utilized on the nodes of the line drawings of FIG. 1D to represent colors.

This sequence of user-interfaces shows how the present implementations provide a technical solution to the explainability challenge by enabling users (e.g., network operators) to examine the code 106 and understand the techniques used by LLMs to derive answers while assessing their accuracy. Moreover, these implementations provide technical solutions that overcome both scalability and privacy concerns by removing the necessity to transfer network data to LLMs, as the input for LLMs is the natural language query and the output solely comprises LLM-generated code. The code is then applied to the network information rather than putting the network information into the LLM.

A core principle of the novel framework involves integrating application-specific requests with general program synthesis techniques to create code customized for graph manipulation tasks in network management. The novel architecture provides a technical solution that separates the process of generating high-quality code into two key components: (1) an application-specific element (e.g., application prompt generator) that supplies context, instructions, or plugins, which enhances the LLMs' comprehension of network structures, attributes, and terminology, and (2) a code generation element (e.g., code-gen prompt generator) that leverages suitable libraries and cutting-edge program synthesis techniques to produce code. This architecture fosters independent innovation of distinct components.

The novel aspects provide a technical approach to network management that employs LLMs for generating code for graph manipulation tasks, enabling a natural-language-based network administration experience. A benchmarking system is employed that encompasses two network administration applications: network traffic analysis and network lifecycle management. Applications are evaluated with three code generation techniques and four distinct LLMs to validate the capability of the present approach in generating high-quality code for graph manipulation tasks. These aspects are described in more detail below.

The description now examines graph analysis and the role of graph manipulation in network management, followed by discussing LLM advancements and their potential application in this domain.

Graph analysis and manipulation is useful in network management. Network management tends to involve an array of tasks such as network planning, monitoring, configuration, and/or troubleshooting. As networks expand in size and complexity, these tasks become progressively more challenging. For instance, network operators are required to configure and monitor thousands of network devices to enforce intricate policies and monitor these devices to guarantee their proper functionality. Numerous operations can be modeled as graph analysis and manipulation for network topologies or communication graphs. Two examples of these tasks are described below.

The first example involves network traffic analysis. Network operators analyze network traffic for various reasons, such as identifying bottlenecks, congestion points, underutilized resources, and/or traffic classification, among others. A valuable representation in traffic analysis is traffic dispersion graphs (TDGs) or communication graphs, in which nodes represent network components like routers, switches, and/or devices, and edges symbolize the connections or paths between these components. An example is illustrated in FIG. 1D. These graphs offer a visual representation of data packet paths, facilitating a comprehensive understanding of traffic patterns. Network operators typically utilize these graphs in two ways: (1) examining these graphs to understand the network's current state for network performance optimization, traffic classification, and anomaly detection, and (2) manipulating the nodes and edges to simulate the impact of their actions on the network's performance and reliability.

The second example involves network lifecycle management. Managing the entire lifecycle of a network entails various phases, including capacity planning, network topology design, deployment planning, and/or diagnostic operations, among others. The majority of these operations necessitate an accurate representation of network topology at different abstraction levels and the manipulation of topology to achieve the desired network state. For example, network operators might employ a high-level topology to plan the network's capacity and explore different alternatives for increasing bandwidth between two data centers. Similarly, network engineers may utilize a low-level topology to ascertain the location of network devices and their connections to other devices.

For at least the above reasons, graph analysis and manipulation are crucial in network management. A unified interface capable of comprehending and executing these tasks has the potential to significantly streamline the process, saving network operators considerable time and effort.

The description now turns to LLMs and program synthesis. Automated program generation based on natural language descriptions, also known as program synthesis, has been a long-standing research challenge. Until recently, program synthesis had primarily been limited to specific domains, with general program synthesis considered to be out of reach. The breakthrough emerged with the advancement of LLMs, which are trained on extensive corpora of natural language text from the internet and massive code repositories such as GitHub. LLMs have demonstrated remarkable proficiency in learning the relationship between natural language and code, achieving state-of-the-art performance in domain-specific tasks, such as natural language to database queries as well as human-level performance in tasks such as programming competitions and mock technical interviews. Recently, these advancements have led to experimental plugins designed to solve mathematical problems and perform data analysis through code generation.

The recent breakthrough in program synthesis using LLMs has ignited a surge of research aimed at advancing the state of the art in this field. These techniques can generally be classified into three approaches: (1) code selection, which involves generating multiple samples with LLMs and choosing the best one based on the consistency of execution results or auto-generated test cases; (2) few-shot examples, which supply LLMs with several examples of the target program's input-output behavior; and (3) feedback and self-reflection, which incorporates a feedback or reinforcement learning outer loop to help LLMs learn from their errors. These advanced techniques continue to expand the horizons of program synthesis, empowering LLMs to generate more complex and accurate programs.

Figure 2:
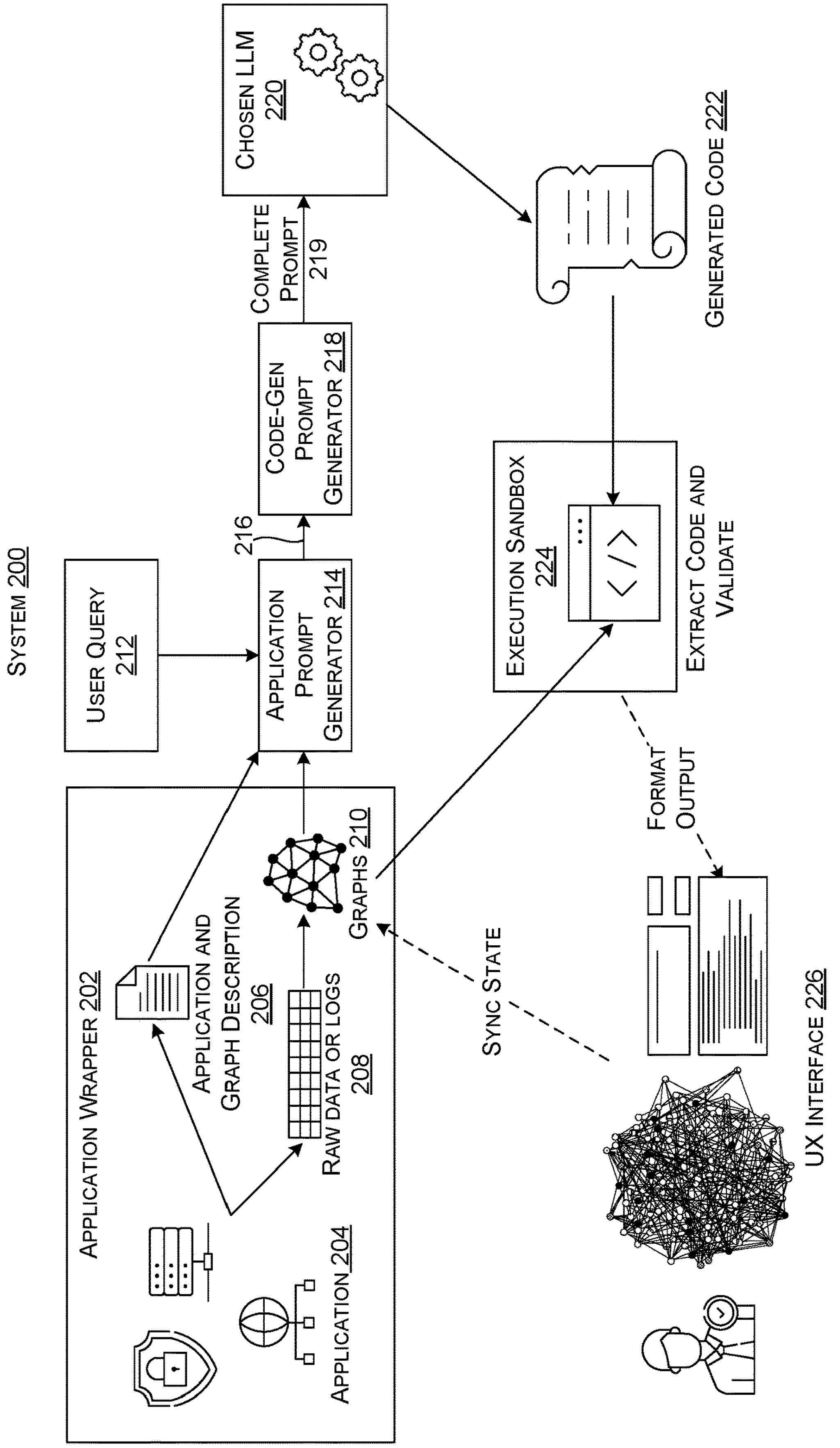
FIGS. 2, 3, and 6 show example graph analysis and manipulation systems that are consistent with some implementations of the present concepts.

FIG. 2 shows an example system or system framework 200 that can accomplish the concepts introduced above and below. The framework consists of an application wrapper 202. The application wrapper 202 relates to applications 204, application and graph descriptions 206, and raw data 208. The application wrapper 202 encapsulates or uses domain-specific knowledge, such as the definitions of nodes and edges (e.g., entities and relationships based on the user query) and then populates a prompt template with the contextual information. This allows the system framework to transform the application data into a graph representation 210. This information, together with natural language user queries 212, is processed by an application prompt generator 214 to create a task-specific prompt 216 for the LLM. The task-specific prompt can be generated with templates and query contexts.

The system framework 200 is designed to offer flexibility regarding code-gen prompt generator 218 and LLMs 220. This enables the use of various techniques for different applications 204. The application prompt generator 214 can be configured to utilize the application wrapper 202 to encapsulate domain-specific knowledge that includes definitions of nodes and edges and can be configured to transform application data into graph 210. Subsequently, the task-specific prompt 216 is combined with general code-gen prompt generator 218 to generate a complete prompt 219. The complete prompt 219 is used to instruct the LLM 220 to produce/generate code 222 for graph analysis and manipulation tasks. Upon generating the code 222, it is executed within an execution sandbox 224 on the graph representation 210 of the network. The generated code 222 can utilize plugins and libraries to respond to user's queries 212 in the constructed graph 210. The LLM-generated code 222 and the resulting execution outcomes are displayed on a user-experience (UX) interface 226 and as shown in FIGS. 1C and 1D, respectively. The UX interface 226 is an example of the user-interface 102 introduced relative to FIGS. 1A-1D. If the user approves the results, the UX interface sends the updated graph back to the application wrapper 202 to modify the network state and record the input/output for future prompt enhancements.

The application wrapper 202 offers context-specific information related to the network management application and the network itself. For instance, the multi-abstraction-layer topology representation (MALT) wrapper can extract the graph of entities and relationships from the underlying data, describing entities (e.g., packet switches, control points, etc.) and relationships (e.g., contains, controls, etc.) in natural language. This information assists LLMs 220 in comprehending the network management application and the graph data structure. Additionally, the application wrapper 202 can provide application-specific plugins and/or code libraries to make LLM tasks more straightforward. The application wrapper also offers a secure environment to run the code 222 generated by the LLMs 220.

The purpose of the application prompt generator 214 is to accept both the user query 212 and the information from the application wrapper 202 as input, and then generate a prompt specifically tailored to the query and task for the LLM. To achieve this, the application prompt generator 214 can utilize a range of static and dynamic techniques. For instance, when working with MALT, the application prompt generator 214 can dynamically select relevant entities and relationships based on the user query 212, and then populate a prompt template with the contextual information. The system framework is designed to offer flexibility with regard to the code-gen prompt generator 218 and LLMs 220, enabling the use of various techniques for different applications 204.

The execution sandbox 224 offers a secure environment for running the code generated by LLMs. The execution sandbox 224 can be established using virtualization or containerization techniques, ensuring limited access to program libraries and system calls. Additionally, this element provides a chance to enhance the security of both code and system by validating network invariants and/or examining output formats.

This novel system framework 200 is designed to revolutionize network management by utilizing LLMs to generate task-specific code. This system framework is founded on two key insights. First, numerous network management operations can be transformed into graph analysis and manipulation tasks. This transformation allows for a unified design and a more focused task for program synthesis (e.g., code generation). Second, the prompt generation techniques can be separated between domain-specific techniques and general program-synthesis techniques. This separation enables high-quality code generation by combining the strengths of domain specialization and advanced program synthesis techniques. This allows the system framework to generate high-quality code for network management tasks.

Figure 3:
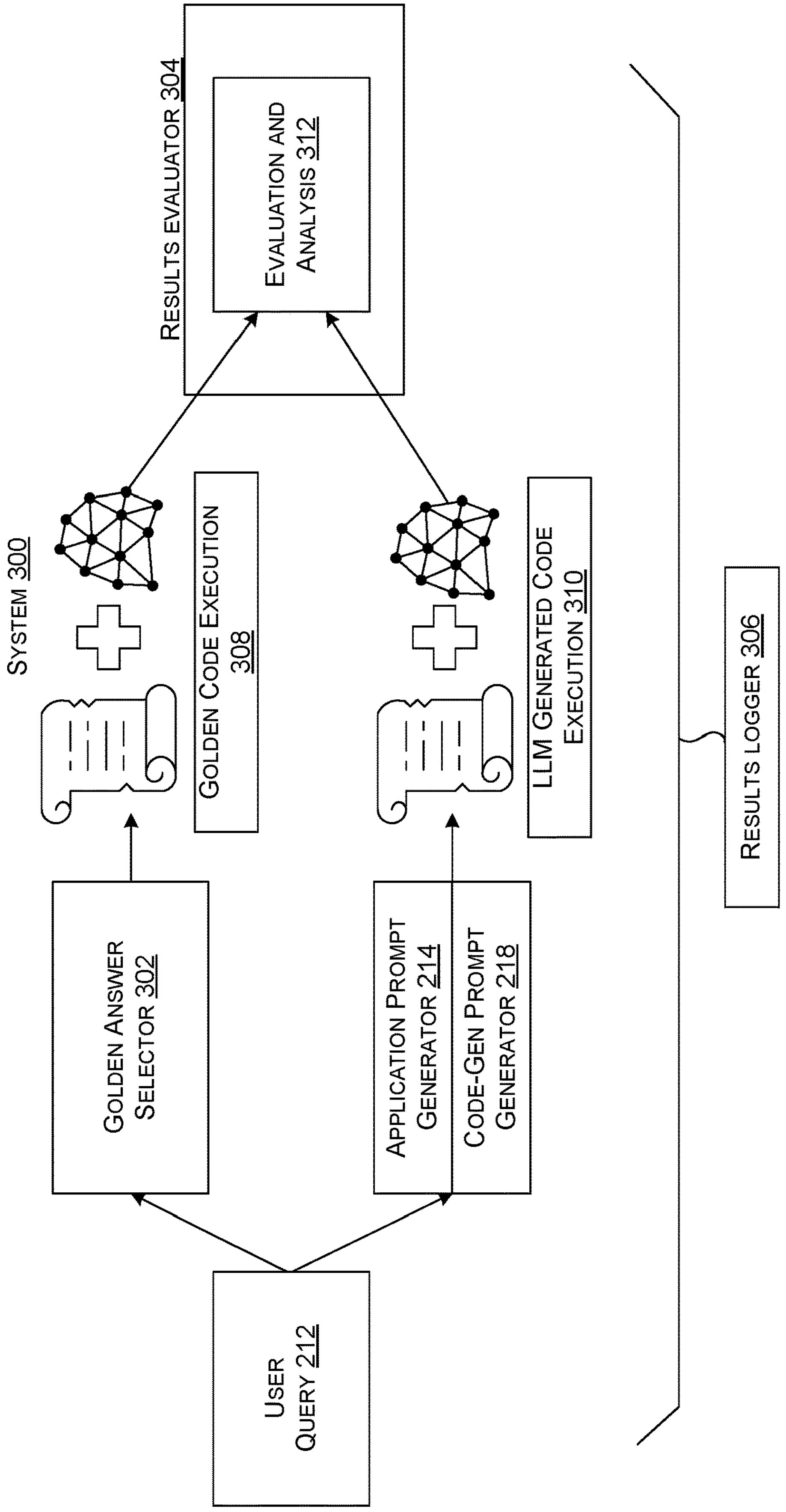

The description now turns to implementation and evaluation of the LLM generated code execution. This aspect can be achieved by a benchmark system. FIG. 3 shows an example benchmark system 300.

The benchmark system 300 can evaluate the effectiveness of LLM-based network management systems. FIG. 3 illustrates the architecture of this example benchmark system. In this case, the benchmark system consists of three primary components: a golden answer selector 302; a results evaluator 304; and a results logger 306.

The description first turns to the golden answer selector 302. For each test input user query, a "golden answer" is created with the help of human experts. These verified answers are stored in a golden answer selector's dictionary file. The golden answer acts as the ground truth for evaluating LLM-generated code.

The results evaluator 304 provides evaluation and analysis of the LLM-generated code (222, FIG. 2). The system executes the LLM-generated code on network data in the sandbox (224, FIG. 2), comparing outcomes with the golden answer's executed results. This aspect is represented as golden code execution 308 and LLM generated code execution 310 being fed to the results evaluator 304 for evaluation and analysis 312. If they match, the LLM passes; otherwise, it fails, and the system (e.g., the results logger 306) documents the findings for further analysis.

The results logger 306 allows the system to log the results of each user query 212, including the LLM-generated code 222, the golden answer, and the comparison results provided by the evaluation and analysis module 312. The results logger 306 also records any code execution errors that may have occurred during the evaluation process. These logs facilitate the analysis of the LLM's performance and the identification of potential improvement.

The description now explains the experimental setup utilized to test the performance of the present implementations.

Two applications were implemented and evaluated relating to network traffic analysis and network lifecycle management. In relation to network traffic analysis, synthetic communication graphs were generated with varying numbers of nodes and edges. Each edge represents communication activities between two nodes with random weights in bytes, connections, and packets. 24 queries were developed by curating trial users' queries, encompassing common tasks such as topology analysis, information computation, and graph manipulation.

In relation to network lifecycle management, the example MALT model was utilized and converted into a directed graph with 5493 nodes and 6424 edges. Each node represents one or more device or node types in a network, such as packet switches, chassis, and ports, with different node types containing various attributes. Directed edges encapsulate relationships between devices, like control or containment associations. Nine network management queries were developed focusing on operational management, WAN capacity planning, and topology design.

The queries are grouped into three complexity levels ("Easy," "Medium," and "Hard") according to their solution length. Table 1 displays an example query from each category due to page limits.

TABLE 1

User Query Examples.

| Complexity Level | Traffic Analysis | MALT |
|---|---|---|
| Easy | Add a label app:production to nodes with address prefix 15.76 | List all ports that are contained by packet switch ju1.a1.m1.s2c1. |
| Medium | Assign a unique color for each/16 IP address prefix. | Find the first and the second largest Chassis by capacity. |
| Hard | Calculate total byte weight on each node, cluster them into 5 groups. | Remove packet switch P1 from Chassis 4, balance the capacity afterward. |

TABLE 2

Accuracy Summary for Both Applications.

| | Traffic Analysis | | | | MALT | | |
|---|---|---|---|---|---|---|---|
| | Strawman | SQL | Pandas | NetworkX | SQL | Pandas | NetworkX |
| GPT-4 | 0.29 | 0.50 | 0.38 | 0.88 | 0.11 | 0.56 | 0.78 |
| GPT-3 | 0.17 | 0.13 | 0.25 | 0.63 | 0.11 | 0.44 | 0.44 |
| text-davinci-003 | 0.21 | 0.29 | 0.29 | 0.63 | 0.11 | 0.22 | 0.56 |
| Google Bard | 0.25 | 0.21 | 0.25 | 0.59 | 0.11 | 0.33 | 0.44 |

TABLE 3

Breakdown for Traffic Analysis.

| | Strawman E(8)/M(8)/H(8) | SQL E(8)/M(8)/H(8) | Pandas E(8)/M(8)/H(8) | NetworkX E(8)/M(8)/H(8) |
|---|---|---|---|---|
| GPT-4 | 0.50/0.38/0.0 | 0.75/0.50/0.25 | 0.50/0.50/0.13 | 1.0/1.0/0.63 |
| GPT-3 | 0.38/0.13/0.0 | 0.25/0.13/0.0 | 0.50/0.25/0.0 | 1.0/0.63/0.25 |
| text-davinci-003 | 0.38/0.25/0.0 | 0.63/0.25/0.0 | 0.63/0.25/0.0 | 1.0/0.75/0.13 |
| Google Bard | 0.50/0.25/0.0 | 0.38/0.25/0.0 | 0.50/0.13/0.13 | 0.88/0.50/0.38 |

TABLE 4

Breakdown for MALT.

| | SQL E(3)/M(3)/H(3) | Pandas E(3)/M(3)/H(3) | NetworkX E(3)/M(3)/H(3) |
|---|---|---|---|
| GPT-4 | 0.33/0.0/0.0 | 0.67/0.67/0.33 | 1.0/1.0/0.33 |
| GPT-3 | 0.33/0.0/0.0 | 0.67/0.67/0.0 | 0.67/0.67/0.0 |
| text- | 0.33/0.0/0.0 | 0.33/0.33/0.0 | 0.67/0.67/0.33 |

TABLE 4-continued

Breakdown for MALT.

| | SQL E(3)/M(3)/H(3) | Pandas E(3)/M(3)/H(3) | NetworkX E(3)/M(3)/H(3) |
|---|---|---|---|
| davinci-003 | | | |
| Google Bard | 0.33/0.0/0.0 | 0.67/0.33/0.0 | 0.67/0.33/0.33 |

Four state-of-the-art LLMs were studied, including GPT-4, GPT-3, text-davinci-003 (a variant of GPT 3.5), and Google Bard. It is contemplated that the present concepts can be applied to future LLMs. Two open LLMs, StarCoder and InCoder, were also examined, but the results were inconsistent. With all OpenAI LLMs, their temperature was set to 0 to ensure consistent output across multiple trials. Since the temperature of Google Bard cannot be changed, each query was sent five times and the average passing probability was calculated.

Three code-generation approaches were implemented, including NetworkX, Pandas, and SQL.

In relation to NetworkX, the network data was represented as a NetworkX graph, which offers flexible APIs for efficient manipulation and analysis of network graphs.

In relation to Pandas, the network data was represented using two Pandas dataframes: a node dataframe, which stores node indices and attributes, and an edge dataframe, which encapsulates the link information among nodes through an edge list. Pandas provides many built-in data manipulation techniques, such as filtering, sorting, and grouping.

In relation to SQL, the network data was represented as a database queried through SQL, consisting of a table for nodes and another for edges. The table schemas are similar to those in Pandas.

A (strawman) baseline was also evaluated that directly feeds the original network graph data in JSON format to the LLM and requests it to address the query. However, in light of the token constraints on LLMs, the evaluation of this approach was limited to synthetic graphs for network traffic analysis, where data size can be controlled.

Table 2 summarizes the benchmark system (e.g., code correctness) results for network traffic analysis and network lifecycle management, respectively. Three key points were observed. First, using LLMs for network management code generation significantly outperforms the strawman baseline in both applications. Second, employing a graph library (NetworkX) greatly enhances code accuracy compared to Pandas and SQL, as LLMs can leverage or directly map natural-language graph operation to NetworkX's graph manipulation APIs to streamline or simplify the generated code. This trend is consistent across all four tested LLMs. Finally, pairing NetworkX with the state-of-the-art GPT-4 model produces the highest (e.g., best) results (88% and 78%, respectively), making it a promising strategy for network management code generation.

To understand the impact of task difficulty, the accuracy results are broken down in Tables 2 and 3. The accuracy of LLM-generated code decreases as task complexity increases. This trend is consistent across all LLMs and approaches, with the performance disparities becoming more pronounced for network lifecycle management (Table 2). Analysis of the LLM-generated code reveals that the complex relationships in the MALT dataset make LLMs more prone to errors in challenging tasks.

TABLE 5

Error Type Summary of LLM Generated Code.

| LLM's Error Type (NetworkX) | Traffic Analysis (35) | MALT (17) |
|---|---|---|
| Syntax Error | 9 | 0 |
| Imaginary Graph Attributes | 9 | 1 |
| Imaginary Files/Function Arguments | 3 | 2 |
| Arguments Error | 7 | 8 |
| Operation Error | 4 | 2 |
| Wrong Calculation Logic | 2 | 3 |
| Graphs are not Identical | 1 | 1 |

TABLE 6

Improvement Cases with Bard on MALT.

| | Bard + Pass@1 | Bard + Pass@5 | Bard + Self-debug |
|---|---|---|---|
| NetworkX | 0.44 | 1.0 | 0.67 |

The description now turns to case studies. For the NetworkX approach across all four LLMs, there are 36 failures out of 96 tests (24×4) for network traffic analysis and 17 failures out of 36 tests (9×4) for network lifecycle management, respectively. Table 5 summarizes the error types. More than half of the errors are related to syntax errors or imaginary attributes. A case study was utilized to see whether using complementary and more advanced program synthesis techniques could correct these errors.

Two techniques were assessed: (1) pass@k, where the LLM is queried k times with the same question, and it is deemed successful if at least one of the answers is correct. This method reduces errors arising from the LLM's inherent randomness and can be combined with code selection techniques for improved results; (2) self-debug, which involves providing the error message back to the LLM, encouraging it to correct the previous response.

A case study was employed using the Bard model and three unsuccessful network lifecycle queries with the NetworkX approach. Table 6 shows that both pass@k (k=5) and self-debug significantly enhance code quality, resulting in improvements of 100% and 67%, respectively. These results indicate that applying complementary techniques has considerable potential for further improving the accuracy of LLM-generated code in network management applications.

Figure 4A:
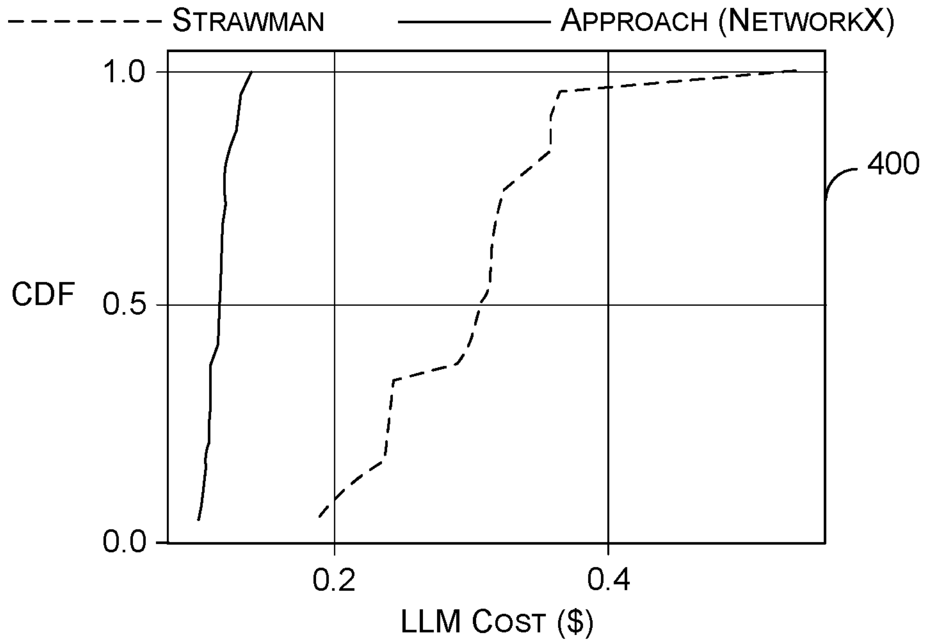
FIGS. 4A and 4B illustrate example graphs that are consistent with some implementations of the present concepts.
Figure 4B:
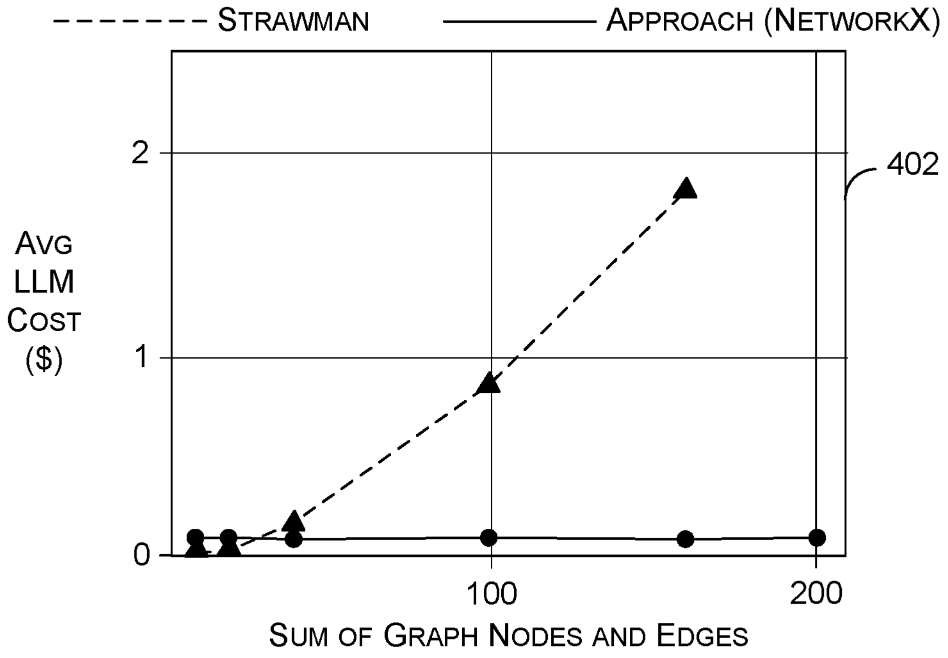

The LLM cost was examined utilizing GPT-4 pricing on Azure for the network traffic analysis application. LLM models and pricing are provided for purposes of explanation and are expected to evolve over time. FIG. 4A shows a graph 400 that represents CDF over LLM cost. The graph 400 shows that the strawman approach is three times costlier than the present methods for a small graph with 80 nodes and edges. FIG. 4B shows graph 402 of average LLM cost over the sum of graph nodes and edges. Graph 402 shows that as the graph size expands, the gap between the two approaches grows, with the strawman approach surpassing the LLM's token limit for a moderate graph containing 150 nodes and edges. Conversely, the present methods have a small cost (<$0.2 per query or about $0.1 per query) that remains unaffected by graph size increases.

Recent advancements in LLMs have paved the way for new opportunities in network management. The present concepts include a system framework (200, FIG. 2) that leverages LLMs to create task-specific code for graph manipulation, tackling issues of explainability, scalability, and privacy.

As the evaluation demonstrates, the LLM-generated code (222, FIG. 2) is highly accurate for easy and medium tasks; however, the accuracy decreases for more complex tasks. This is partially due to the LLMs being trained on a general code corpus without specific network management knowledge.

In summary, the present concepts offer a pioneering step in introducing a general framework for using LLMs in network management, presenting a new frontier for streamlining and/or simplifying network operators' tasks.

As described above, LLM-generated code can tackle explainability, scalability, and privacy challenges in LLM-based network management. However, merely applying existing approaches is inadequate for network management tasks, as existing techniques do not comprehend the domain-specific and application-specific requirements. One of the key technical challenges lies in harnessing recent advancements in LLMs and general program synthesis to develop a unified interface capable of accomplishing network management tasks, which forms the design requirements for the present solutions.

The example user-interface described relative to FIGS. 1A-1D allows network operators to submit natural-language queries and obtain code for handling network topologies and communication graphs. To assess effectiveness systematically, a benchmarking system can be employed. The benchmarking system includes two applications: (1) network traffic analysis using communication graphs, and (2) network lifecycle management based on multi-abstraction-layer topology representation (MALT). These applications are evaluated with three code generation approaches (SQL, Pandas, and NetworkX) and four distinct LLMs. Investigation shows that the system is capable of producing high-quality code for graph manipulation tasks. Utilizing the NetworkX-based approach attains average accuracies (e.g., code correctness or code with correct functionality for the query) of 68% and 56% across all tasks for the four LLMs (up to 88% and 78% with GPT-4) for network traffic analysis and network lifecycle management, respectively. In comparison, the strawman baseline, which inputs the graph data into LLMs, only reaches an average accuracy or correctness of 23% for the traffic analysis application. The present methods significantly improve the average accuracy by 45%, rendering them viable options. Additionally, integrating the system with advanced program synthesis methods could further enhance code quality for complex tasks. Finally, the current approaches are cost-effective, with an average expense of $0.1 per task, and the LLM cost stays constant regardless of network sizes.

Figure 5:
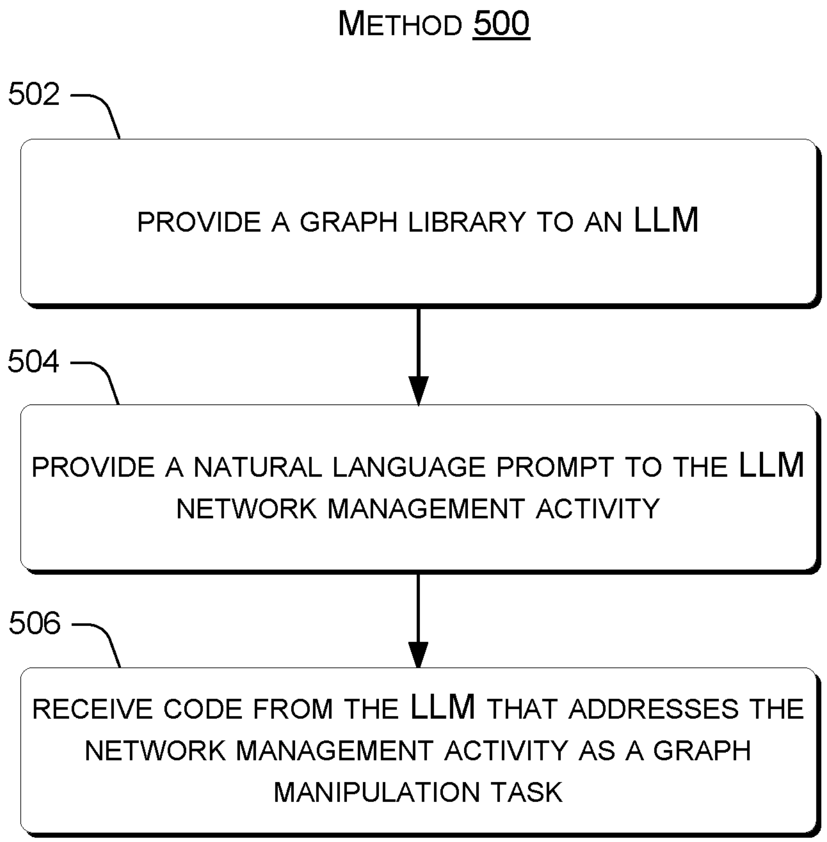
FIG. 5 illustrates an example flowchart that is consistent with some implementations of the present concepts.

Several implementations are described in detail above. FIG. 5 shows a flowchart of an additional example method 500 that is consistent with the description above. At block 502, the method can provide a graph library to an LLM.

At block 504, the method can provide a natural language prompt for a graph manipulation task to the LLM.

At block 506, the method can receive code from the LLM that addresses the graph manipulation task. Thus, the method receives the code from the LLM without providing the graph or graph information to the LLM. Thus, data privacy can be maintained. Instead, the code is applied locally to manipulate the graph from the original graph to an updated graph. Further, the user can inspect the code and decide whether to run the code on the graph. Further still the user can then decide whether to retain the updated graph or revert to the original graph.

The order in which the disclosed methods are described is not intended to be construed as a limitation, and any number of the described acts can be combined in any order to implement the method, or an alternate method. Furthermore, the methods can be implemented in any suitable hardware, software, firmware, or combination thereof, such that a computing device can implement the method. In one case, the methods are stored on one or more computer-readable storage media as a set of instructions such that execution by a processor of a computing device causes the computing device to perform the method.

Figure 6:
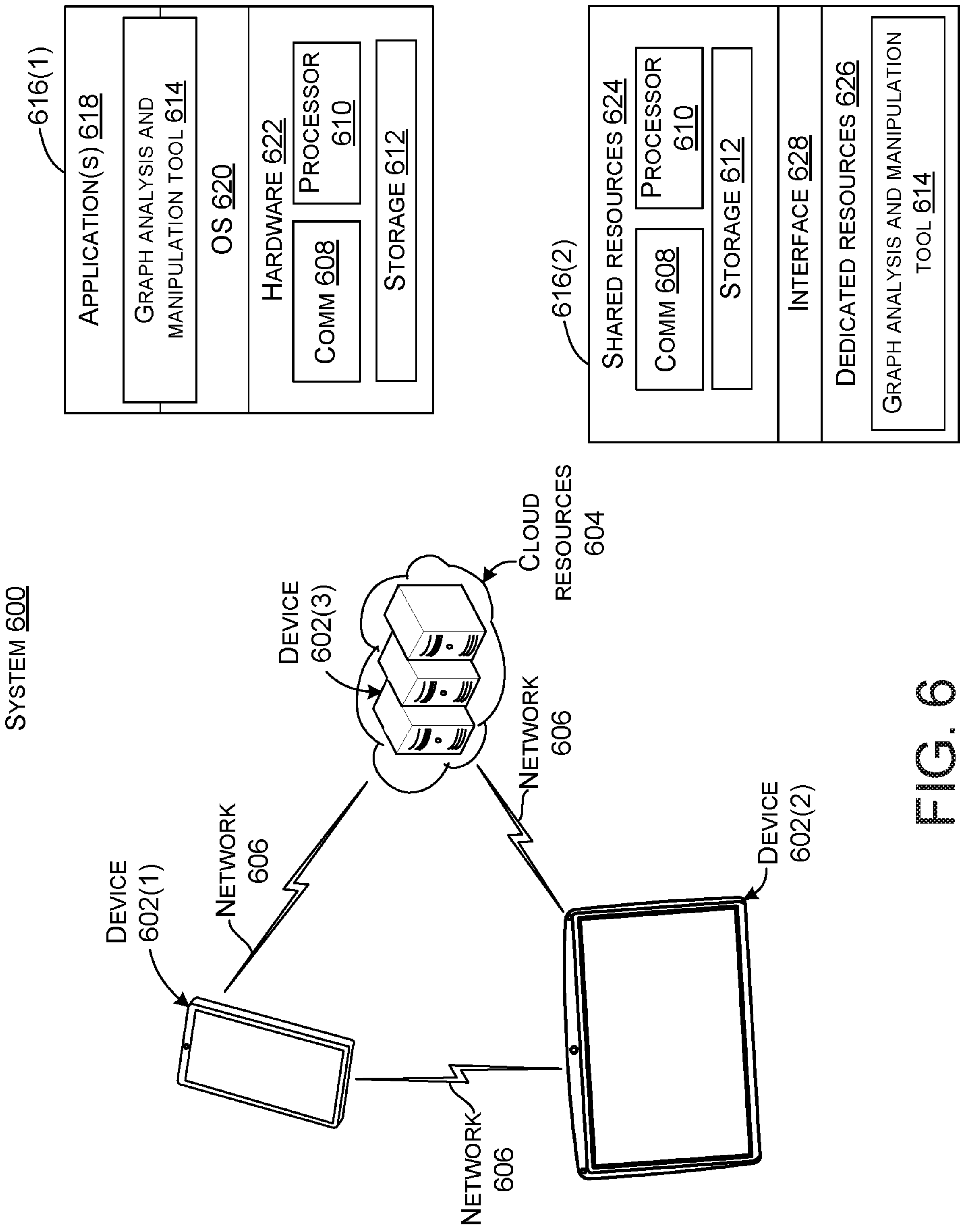

FIG. 6 shows an example system 600. System 600 can include computing devices 602. In the illustrated configuration, computing device 602(1) is manifest as a smartphone, computing device 602(2) is manifest as a tablet type device, and computing device 602(3) is manifest as a server type computing device, such as may be found in a datacenter as a cloud resource 604. Computing devices 602 can be coupled via one or more networks 606 that are represented by lightning bolts.

Computing devices 602 can include a communication component 608, a processor 610, storage resources (e.g., storage) 612, and/or graph analysis and manipulation tool 614.

The graph analysis and manipulation tool 614 can be configured to receive a natural language prompt relating to a network management activity and to access a graph resource and to generate code that addresses the network management activity as a graph manipulation task. Example graph resources can include plugins, libraries, application program interfaces (APIs), and/or instructions relating to graphs, among others. The graph analysis and manipulation tool 614 can implement and/or interact with the system frameworks 200 and 300 introduced above relative to FIGS. 2 and 3, respectively. Further, the graph analysis and manipulation tool 614 can cause the user-interfaces of FIGS. 1A-1D to be generated.

FIG. 6 shows two device configurations 616 that can be employed by computing devices 602. Individual computing devices 602 can employ either configuration 616(1) or 616(2), or an alternate configuration. (Due to space constraints on the drawing page, one instance of each configuration is illustrated). Briefly, device configuration 616(1) represents an operating system (OS) centric configuration. Device configuration 616(2) represents a system on a chip (SOC) configuration. Device configuration 616(1) is organized into one or more applications 618, operating system 620, and hardware 622. Device configuration 616(2) is organized into shared resources 624, dedicated resources 626, and an interface 628 therebetween.

In configuration 616(1), the graph analysis and manipulation tool 614 can be manifest as part of the operating system 620. Alternatively, the graph analysis and manipulation tool 614 can be manifest as part of the applications 618 that operates in conjunction with the operating system 620 and/or processor 610. In configuration 616(2), the graph analysis and manipulation tool 614 can be manifest as part of the processor 610 or a dedicated resource 626 that operates cooperatively with the processor 610.

In some configurations, each of computing devices 602 can have an instance of the graph analysis and manipulation tool 614. However, the functionalities that can be performed by the graph analysis and manipulation tool 614 may be the same or they may be different from one another when comparing computing devices. For instance, in some cases, each graph analysis and manipulation tool 614 can be robust and provide all of the functionality described above and below (e.g., a device-centric implementation).

In other cases, some devices can employ a less robust instance of the graph analysis and manipulation tool 614 that relies on some functionality to be performed by a graph analysis and manipulation tool 614 on another device.

The term "device," "computer," or "computing device" as used herein can mean any type of device that has some amount of processing capability and/or storage capability. Processing capability can be provided by one or more processors that can execute data in the form of computer-readable instructions to provide a functionality. Data, such as computer-readable instructions and/or user-related data, can be stored on/in storage, such as storage that can be internal or external to the device and is configured to store the data. The storage can include any one or more of volatile or non-volatile memory, hard drives, flash storage devices, and/or optical storage devices (e.g., CDs, DVDs etc.), remote storage (e.g., cloud-based storage), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

As mentioned above, device configuration 616(2) can be thought of as a system on a chip (SOC) type design. In such a case, functionality provided by the device can be integrated on a single SOC or multiple coupled SOCs. One or more processors 610 can be configured to coordinate with shared resources 624, such as storage 612, etc., and/or one or more dedicated resources 626, such as hardware blocks configured to perform certain specific functionality. Thus, the term "processor" as used herein can also refer to central processing units (CPUs), graphical processing units (GPUs), field programmable gate arrays (FPGAs), controllers, microcontrollers, processor cores, hardware processing units, or other types of processing devices.

Generally, any of the functions described herein can be implemented using software, firmware, hardware (e.g., fixed-logic circuitry), or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU, CPUs, GPU or GPUs). The program code can be stored in one or more computer-readable memory devices, such as computer-readable storage media. The features and techniques of the components are platform-independent, meaning that they may be implemented on a variety of commercial computing platforms having a variety of processing configurations.

Various examples are described above. Additional examples are described below. One example includes a device-implemented method comprising providing a graph library to a large language model (LLM), providing a natural language prompt for a graph manipulation task to the LLM, and receiving code from the LLM that addresses the graph manipulation task.

Another example can include any of the above and/or below examples where providing a natural language prompt comprises providing a task-specific prompt to the LLM.

Another example can include any of the above and/or below examples where the graph manipulation task relates to an original graph, and wherein providing a natural language prompt for a graph manipulation task to the LLM does not include providing the original graph to the LLM.

Another example can include any of the above and/or below examples where the method further comprises causing a user-interface to be generated that presents the code for a user that generated the graph manipulation task.

Another example can include any of the above and/or below examples where the user-interface further allows the user to select to execute the code on the original graph or discard the code.

Another example can include any of the above and/or below examples where the method further comprises executing the code on the original graph without exposing the original graph to the LLM.

Another example can include any of the above and/or below examples where the method further comprises causing the user-interface to present both an updated graph that reflects the code execution and the original graph.

Another example can include any of the above and/or below examples where the method further comprises causing the user-interface to allow the user to select the updated graph.

Another example can include any of the above and/or below examples where in a condition where the user selects the updated graph, further comprising updating a network state to reflect the updated graph.

Another example can include a system comprising hardware, and a graph analysis and manipulation tool configured to receive a natural language prompt relating to a network management activity and to access a graph resource and to generate code that addresses the network management activity as a graph manipulation task.

Another example can include any of the above and/or below examples where the graph resource comprises plugins, libraries, and/or instructions relating to graphs.

Another example can include any of the above and/or below examples where the system further comprises an application wrapper configured to encapsulate domain-specific knowledge comprising definitions of nodes and edges of a network and configured to transform application data of the network into a graph.

Another example can include any of the above and/or below examples where the system further comprises a code-generation prompt generator configured to utilize a task-specific prompt to cause a large language model (LLM) to produce code for the task-specific prompt as a graph analysis and manipulation task.

Another example can include a system comprising a storage configured to store computer executable instructions for executing an application wrapper configured to encapsulate domain-specific knowledge comprising definitions of nodes and edges and configured to transform application data into a graph, an application prompt generator configured to utilize the encapsulated domain-specific knowledge and the graph to create a task-specific prompt for a large language model (LLM), and a code-generation prompt generator configured to utilize the task-specific prompt to cause the LLM to produce code for the task specific prompt as a graph analysis and manipulation task.

Another example can include any of the above and/or below examples where the system is configured to execute the code on the graph in a sandbox.

Another example can include any of the above and/or below examples where the system is configured to present the code for approval before running the code.

Another example can include any of the above and/or below examples where the system is configured to update the graph with the code and send the updated graph back to an application wrapper to modify a network state and record input and output for future prompt enhancements.

Another example can include any of the above and/or below examples where the system includes the LLM or wherein the system accesses the LLM.

Another example can include any of the above and/or below examples where the graph represents a network state and the updated graph represents an updated network state.

Another example can include any of the above and/or below examples where the code-gen prompt generator is configured to utilize the task-specific prompt to cause the LLM to produce the code without exposing the graph or the network state to the LLM.

CONCLUSION

The description includes graph analysis and manipulation concepts. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:

1. A device-implemented method comprising:

receiving a natural language prompt comprising a graph manipulation task relating to a network;

generating an updated prompt for a large language model (LLM) from the natural language prompt and information from a graph library without data from the network;

receiving code from the LLM that addresses the graph manipulation task;

testing performance of the code on a graph of the network in a sandbox to generate an updated network graph; and, presenting the network graph and the updated network graph in a manner that includes a user selectable option to execute the code on the network or to maintain the network and discard the code.

2. The method of claim 1, wherein receiving the natural language prompt comprises providing a task-specific prompt.

3. The method of claim 1, wherein the graph manipulation task relates to the network graph, and wherein receiving the natural language prompt for the graph manipulation task does not include providing the network graph to the LLM.

4. The method of claim 3, wherein the presenting comprises causing a user-interface to be generated that presents the code for a user that generated the graph manipulation task.

5. The method of claim 4, wherein the user-interface further allows the user to select to execute the code on the network graph or discard the code.

6. The method of claim 5, further comprising executing the code on the network graph without exposing the network graph to the LLM.

7. The method of claim 6, further comprising causing the user-interface to present both the updated network graph that reflects the code execution and the network graph.

8. The method of claim 7, further comprising causing the user-interface to allow the user to select the updated network graph.

9. The method of claim 8, in a condition where the user selects the updated network graph, further comprising updating a network state to reflect the updated network graph.

10. A system, comprising:

a hardware processor; and, a graph analysis and manipulation tool, when executed by the hardware processor is configured to receive a natural language prompt relating to a network management activity relating to a network and to access a graph resource comprising plugins, libraries, and/or instructions relating to graphs and to generate an updated prompt utilizing the graph resource and the natural language prompt that causes a large language model to generate code that addresses the network management activity as a graph manipulation task without exposing the network to the large language model.

11. The system of claim 10, wherein the system is further configured to execute the code in a sandbox to allow testing of functionality of the code without exposing the network to the code.

12. The system of claim 11, further comprising an application wrapper configured to encapsulate domain-specific knowledge comprising definitions of nodes and edges of the network and configured to transform application data of the network into a graph.

13. The system of claim 12, further comprising a code-generation prompt generator configured to utilize the updated prompt to cause the large language model to produce the code.

14. A system, comprising:

a storage storing computer executable instructions for executing:

a graph analysis and manipulation tool stored on the storage and configured to generate a user interface (UI) configured to receive a user query regarding a graph manipulation task associated with a network graph that includes network data;

an application wrapper configured to encapsulate domain-specific knowledge comprising definitions of graph nodes and edges;

an application prompt generator configured to utilize the user query and the encapsulated domain-specific knowledge to create a task-specific prompt for a large language model (LLM) that does not include the network data; and, a code-generation prompt generator configured to utilize the task-specific prompt to cause the LLM to produce code for the task-specific prompt without providing the network data to the LLM, and the graph analysis and manipulation tool configured to present the code on the UI and to execute the code in a sandbox and to present the network graph and a code-updated network graph for comparison on the UI, and upon receipt of approval received through the UI to update the network graph with the code.

15. The system of claim 14, wherein the system is configured to execute the code on the network graph only in the sandbox until receipt of approval.

16. The system of claim 15, wherein the system is configured to present the code on the UI for approval before running the code on the network graph.

17. The system of claim 16, wherein the system is configured to send the updated network graph back to the application wrapper to modify a network state and record input and output for future prompt enhancements.

18. The system of claim 17, wherein the system includes the LLM or wherein the system accesses the LLM.

19. The system of claim 18, wherein the network graph represents the network state and the updated network graph represents an updated network state.

20. The system of claim 19, wherein the code-generation prompt generator is configured to utilize the task-specific prompt to cause the LLM to produce the code without exposing the network graph or the network state to the LLM.

* * * * *